US008659823B2

(12) United States Patent
Mercado

(10) Patent No.: US 8,659,823 B2
(45) Date of Patent: Feb. 25, 2014

(54) UNIT-MAGNIFICATION CATADIOPTRIC AND CATOPTRIC PROJECTION OPTICAL SYSTEMS

(75) Inventor: Romeo I. Mercado, Fremont, CA (US)

(73) Assignee: Coherent, Inc., Santa Clara, CA (US)

( * ) Notice: Subject to any disclaimer, the term of this patent is extended or adjusted under 35 U.S.C. 154(b) by 221 days.

(21) Appl. No.: 13/249,679

(22) Filed: Sep. 30, 2011

(65) Prior Publication Data

US 2012/0268836 A1 Oct. 25, 2012

Related U.S. Application Data

(60) Provisional application No. 61/478,362, filed on Apr. 22, 2011.

(51) Int. Cl.
*G02B 17/00* (2006.01)
*G02B 9/08* (2006.01)

(52) U.S. Cl.
USPC ........... 359/366; 359/726; 359/727; 359/729; 359/731; 359/733; 359/734; 359/735; 359/736; 359/739; 359/740; 353/99

(58) Field of Classification Search
USPC ......... 359/366, 726, 727, 729–736, 739, 740; 353/99
See application file for complete search history.

(56) References Cited

U.S. PATENT DOCUMENTS

| | | |
|---|---|---|
| 2,231,378 A | 2/1941 | Becker et al. |
| 3,536,380 A | 10/1970 | Ferguson |
| 3,748,015 A | 7/1973 | Offner |
| 4,103,989 A | 8/1978 | Rosin |
| 4,171,870 A | 10/1979 | Bruning et al. |
| 4,171,871 A | 10/1979 | Dill et al. |
| 4,293,186 A | 10/1981 | Offner |
| 4,302,079 A | 11/1981 | White |
| 4,391,494 A | 7/1983 | Hershel |
| 4,650,315 A * | 3/1987 | Markle .................. 359/731 |
| 4,711,535 A | 12/1987 | Shafer |
| 4,796,984 A | 1/1989 | Wynne |
| 6,104,511 A * | 8/2000 | Hesselink et al. ........... 359/364 |
| 6,809,888 B1 | 10/2004 | Markle |
| 6,813,098 B2 | 11/2004 | Mercado |
| 6,831,731 B2 | 12/2004 | Omura et al. |
| 6,863,403 B2 | 3/2005 | Mercado et al. |
| 6,879,383 B2 | 4/2005 | Mercado |

(Continued)

FOREIGN PATENT DOCUMENTS

EP 1959289 A1 8/2008

OTHER PUBLICATIONS

Bouwer, A., "Achievements in Optics", Elsevier Publishing Company, Inc., 1946, p. 24,25 and 39.

(Continued)

*Primary Examiner* — Evelyn A. Lester
(74) *Attorney, Agent, or Firm* — Morrison & Foerster LLP

(57) ABSTRACT

Ring-field, catoptric and catadioptric, unit-magnification, projection optical systems having non-concentric optical surfaces are disclosed. Each system has a system axis with object and image planes on opposite sides of the system axis. The non-concentric surfaces allow for working distances of the object and image planes in excess of 100 millimeters to be achieved, with a ring-field width sufficient to allow a rectangular object-field having a long dimension in excess of 100 mm to be projected.

20 Claims, 20 Drawing Sheets

(56) References Cited

U.S. PATENT DOCUMENTS

| | | | |
|---|---|---|---|
| 7,116,496 | B1 | 10/2006 | Mercado |
| 7,148,953 | B2 | 12/2006 | Mercado |
| 7,158,215 | B2 | 1/2007 | Harned et al. |
| 7,177,099 | B2 | 2/2007 | Mercado et al. |
| 7,573,655 | B2 | 8/2009 | Shafer |
| 7,643,128 | B2 | 1/2010 | Harned et al. |
| 7,712,905 | B2 | 5/2010 | Shafer et al. |
| 7,746,571 | B2 | 6/2010 | Li et al. |
| 2006/0158615 | A1 | 7/2006 | Williamson |
| 2009/0185290 | A1 | 7/2009 | Li et al. |

OTHER PUBLICATIONS

Bagdasarov et al., "Limiting Capabilities of Concentric Unit-Magnification Lens-Compensated Catadioptric Objectives", Soviet Journal of Optical Technology, vol. 50, No. 3, Mar. 1983, pp. 153-157.

Dyson, J., "Unit Magnification Optical System without Seidel Aberrations", Journal of the Optical Society of America, vol. 49, No. 7, Jul. 1959, pp. 713-716.

Maksutov, D. D., "New Catadioptric Meniscus Systems", Journal of the Optical Society of America vol. 34, No. 5, May 1944, pp. 270-284.

Mercado, Romeo I., Unpublished U.S. Appl. No. 13/221,222, filed Aug. 30, 2011, titled "Large-Field Unit-Magnification Catadioptric Projection System", 50 pages.

Wynne, C. G., "A Unit-Power Telescope for Projection Copying", Optical Instruments and Techniques, Edited by J. Home Dickson, 1969, pp. 429-434.

Wynne, C. G., "Monocentric Telescope for Microlithography", Optical Engineering, vol. 26, No. 4, Apr. 1987, pp. 300-303.

International Search Report and Written Opinion received for PCT Patent Application No. PCT/US2011/049866, mailed on Feb. 21, 2012, 11 pages.

Notice of Allowance received for U.S. Appl. No. 13/221,222, mailed on Apr. 4, 2013, 8 pages.

International Preliminary Report on Patentability received for PCT Patent Application No. PCT/US2011/049866, mailed on Mar. 21, 2013, 9 pages.

International Search Report and Written Opinion received for PCT Patent Application No. PCT/US2012/033968, mailed on Jun. 8, 2012, 9 pages.

Non Final Office Action received for U.S. Appl. No. 13/221,222, mailed on Jan. 23, 2013, 8 pages.

* cited by examiner

FIG. 1A

| NA = 0.10 | Object/ Image Field Distance from Central Reference Axis (mm) 120 - 140 | Design Wavelength (nm) 980 |
|---|---|---|

| SURFACE DESCRIPTION | | | | | ELEMENT |
|---|---|---|---|---|---|
| S# | RADIUS | SHAPE | T or S | MATERIAL | DESCRIPTION |
| 0 | INF | FLT | | | Object Plane |
| | | | 250.0000 | | Working Distance WD1 |
| 1 | 1327.100 CX | SPH | 37.6392 | FUSED SILICA | L1 |
| 2 | -1017.397 | ASP1 | 462.3608 | | |
| 3 | -775.725 | ASP2 | -255.6760 | REFL | Mirror M1 |
| 4 | -490.956 CX | SPH | 255.6760 | REFL (STOP) | Mirror M2 |
| 5 | -775.725 | ASP3 | -462.3608 | REFL | Mirror M3 |
| 6 | -1017.397 | ASP4 | -37.6392 | FUSED SILICA | L2 |
| 7 | 1327.100 CX | SPH | | | |
| | | | -250.0000 | | Working Distance WD2 |
| 8 | INF | FLT | | | Image plane |

ASPHERIC CONSTANTS

| ASPHERIC S# | CURV | K | A | B | C | D |
|---|---|---|---|---|---|---|
| ASP1 | S2 -0.00098290 | 0.000000 | 1.01578E-09 | 1.41069E-15 | 0.00000E+00 | 0.00000E+00 |
| ASP2 | S3 -0.00128912 | 0.000000 | 5.82262E-11 | 6.63013E-17 | 7.89066E-23 | 0.00000E+00 |
| ASP3 | S5 -0.00128912 | 0.000000 | 5.82262E-11 | 6.63013E-17 | 7.89066E-23 | 0.00000E+00 |
| ASP4 | S6 -0.00098290 | 0.000000 | 1.01578E-09 | 1.41069E-15 | 0.00000E+00 | 0.00000E+00 |

*FIG. 3A*

| NA = 0.10 | Object/ Image Field Distance from Central Reference Axis (mm) 110 - 140 | Design Wavelength (nm) 980 |
|---|---|---|

| SURFACE DESCRIPTION | | | | | ELEMENT |
|---|---|---|---|---|---|
| S # | RADIUS | SHAPE | T or S | MATERIAL | DESCRIPTION |
| 0 | INF | FLT | 250.0000 | | Object Plane / Working Distance WD1 |
| 1 | 969.459 | ASP1 | 30.0000 | FUSED SILICA | L1 |
| 2 | INF | FLT | 181.2890 | | |
| 3 | DECENTER( 1) INF BEND( 1) | FLT | -290.0000 | REFL | Fold Mirror FM1 |
| 4 | 755.102 | ASP2 | 307.5556 | REFL | Mirror M1 |
| 5 | 429.798 CX | SPH | -307.5556 | REFL(STOP) | Mirror M2 |
| 6 | 755.102 | ASP3 | 290.0000 | REFL | Mirror M3 |
| 7 | DECENTER( 2) INF BEND( 2) | FLT | -181.289 | REFL | Fold Mirror FM2 |
| 8 | INF | FLT | -30.0000 | FUSED SILICA | L2 |
| 9 | 969.459 | ASP4 | -250.0000 | | Working Distance WD2 |
| 10 | INF | FLT | | | Image plane |

ASPHERIC CONSTANTS

| ASPHERIC | S# | CURV | K | A | B | C | D |
|---|---|---|---|---|---|---|---|
| ASP1 | S1 | 0.00103150 | 0.000000 | -1.77024E-09 | 5.09456E-15 | -9.16748E-21 | 0.00000E+00 |
| ASP2 | S4 | 0.00132432 | 0.000000 | -3.14987E-11 | 5.15212E-18 | -3.09053E-22 | 0.00000E+00 |
| ASP3 | S6 | 0.00132432 | 0.000000 | -3.14987E-11 | 5.15212E-18 | -3.09053E-22 | 0.00000E+00 |
| ASP4 | S9 | 0.00103150 | 0.000000 | -1.77024E-09 | 5.09456E-15 | -9.16748E-21 | 0.00000E+00 |

DECENTERING CONSTANTS

| DECENTER | X | Y | Z | ALPHA | BETA | GAMMA | |
|---|---|---|---|---|---|---|---|
| D(1) | 0.0000 | 0.0000 | 0.0000 | 45.0000 | 0.0000 | 0.0000 | (BEND) |
| D(2) | 0.0000 | 0.0000 | 0.0000 | 45.0000 | 0.0000 | 0.0000 | (BEND) |

*FIG. 5A*

| NA = 0.13 | Object/ Image Field Distance from Reference Central Axis (mm) 69 - 75 | Design Wavelength (nm) 308 |
|---|---|---|

| SURFACE DESCRIPTION | | | | | ELEMENT |
|---|---|---|---|---|---|
| S# | RADIUS | SHAPE | T or S | MATERIAL | DESCRIPTION |
| 0 | INF | FLT | | | Object Plane |
| | | | 124.8931 | | Working Distance WD1 |
| 1 | 858.493 | ASP1 | 19.1068 | FUSED SILICA | L1 |
| 2 | -1912.487 CX | SPH | 260.5168 | | |
| 3 | -403.392 | ASP2 | -166.4780 | REFL | Mirror M1 |
| 4 | -227.323 CX | SPH | 166.4780 | REFL (STOP) | Mirror M2 |
| 5 | -403.392 | ASP3 | -260.5168 | REFL | Mirror M3 |
| 6 | -1912.487 CX | SPH | -19.1068 | FUSED SILICA | L2 |
| 7 | 858.493 | ASP4 | | | |
| | | | -124.8931 | | Working Distance WD2 |
| 8 | INF | FLT | | | Image plane |

ASPHERIC CONSTANTS

| ASPHERIC | S# | CURV | K | A | B | C | D |
|---|---|---|---|---|---|---|---|
| ASP1 | S1 | 0.00116483 | 0.000000 | -8.49385E-09 | 6.96829E-14 | -7.34919E-20 | 0.00000E+00 |
| ASP2 | S3 | -0.00247898 | 0.000000 | 1.49630E-10 | -1.93674E-16 | 1.58328E-20 | 0.00000E+00 |
| ASP3 | S5 | -0.00247898 | 0.000000 | 1.49630E-10 | -1.93674E-16 | 1.58328E-20 | 0.00000E+00 |
| ASP4 | S7 | 0.00116483 | 0.000000 | -8.49385E-09 | 6.96829E-14 | -7.34919E-20 | 0.00000E+00 |

*FIG. 6A*

| | NA = 0.13 | | Object/ Image Field Distance from Reference Central Axis (mm) 70 - 80 | | | Design Wavelength (nm) 309, 308, 307 | |
|---|---|---|---|---|---|---|---|

| | SURFACE DESCRIPTION | | | | | ELEMENT | |
|---|---|---|---|---|---|---|---|
| S# | RADIUS | | SHAPE | T or S | MATERIAL | DESCRIPTION | |
| 0 | INF | | FLT | | | Object Plane | |
| | | | | 101.0000 | | Working Distance WD1 | |
| 1 | 844.638 | CX | SPH | 10.0000 | FUSED SILICA | L1 | |
| 2 | 872.616 | | ASP1 | 6.1259 | | | |
| 3 | 1770.335 | CX | SPH | 19.1717 | CALCIUM FLUORIDE | L2 | |
| 4 | -1021.361 | CX | SPH | 290.6649 | | | |
| 5 | -418.271 | | ASP2 | -175.6621 | REFL | Mirror M1 | |
| 6 | -232.897 | CX | SPH | 175.6621 | REFL(STOP) | Mirror M2 | |
| 7 | -418.271 | | ASP3 | -290.6649 | REFL | Mirror M3 | |
| 8 | -1021.361 | CX | SPH | -19.1717 | CALCIUM FLUORIDE | L3 | |
| 9 | 1770.335 | CX | SPH | -6.1259 | | | |
| 10 | 872.616 | | ASP4 | -10.0000 | FUSED SILICA | L4 | |
| 11 | 844.638 | CX | SPH | | | | |
| | | | | -101.0000 | | Working Distance WD2 | |
| 12 | INF | | FLT | | | Image plane | |

ASPHERIC CONSTANTS

| ASPHERIC S# | | CURV | K | A | B | C | D |
|---|---|---|---|---|---|---|---|
| ASP1 | S2 | 0.00114598 | 0.000000 | 9.39923E-09 | -9.85832E-14 | 0.00000E+00 | 0.00000E+00 |
| ASP2 | S5 | -0.00239079 | 0.000000 | 6.54832E-11 | -5.93275E-16 | 3.84034E-22 | 0.00000E+00 |
| ASP3 | S7 | -0.00239079 | 0.000000 | 6.54832E-11 | -5.93275E-16 | 3.84034E-22 | 0.00000E+00 |
| ASP4 | S10 | 0.00114598 | 0.000000 | 9.39923E-09 | -9.85832E-14 | 0.00000E+00 | 0.00000E+00 |

*FIG. 7A*

| | NA = 0.10 | | Object/ Image Field Distance from Central Axis (mm) 230 - 245 | | Design Wavelength (nm) 980 | |
|---|---|---|---|---|---|---|

| SURFACE DESCRIPTION | | | | | ELEMENT | |
| S# | RADIUS | SHAPE | T or S | MATERIAL | DESCRIPTION | |
|---|---|---|---|---|---|---|
| 0 | INF | FLT | 700.0000 | | Object Plane Object Distance D1 | |
| 1 | -1168.952 | ASP1 | -406.7172 | REFL | Mirror M1 | |
| 2 | -665.367 | ASP2 | 381.7172 | REFL | Mirror M2 | |
| 3 | -753.759 | ASP3 | -381.7172 | REFL(STOP) | Mirror M3 | |
| 4 | -665.367 | ASP4 | 406.7172 | REFL | Mirror M4 | |
| 5 | -1168.952 | ASP5 | | REFL | Mirror M5 | |
| 6 | INF | FLT | -700.0000 | | Image Distance D2 Image plane | |

ASPHERIC CONSTANTS

| ASPHERIC S# | CURV | K | A | B | C | D |
|---|---|---|---|---|---|---|
| ASP1 | S1 -0.00085547 | 0.000000 | 1.84023E-11 | 3.67907E-17 | -1.18191E-22 | 4.61309E-28 |
| ASP2 | S2 -0.00150293 | 0.000000 | 5.03958E-11 | 9.95913E-17 | 1.90178E-21 | 8.73981E-26 |
| ASP3 | S3 -0.00132668 | 0.000000 | -2.21755E-11 | -1.24191E-16 | 6.04648E-22 | 6.17180E-26 |
| ASP4 | S4 -0.00150293 | 0.000000 | 5.03958E-11 | 9.95913E-17 | 1.90178E-21 | 8.73981E-26 |
| ASP5 | S5 -0.00085547 | 0.000000 | 1.84023E-11 | 3.67907E-17 | -1.18191E-22 | 4.61309E-28 |

FIG. 9A

UNIT-MAGNIFICATION CATADIOPTRIC AND CATOPTRIC PROJECTION OPTICAL SYSTEMS

PRIORITY CLAIM

This application claims priority of U.S. Provisional Application No. 61/478,362 filed Apr. 22, 2011, assigned to the assignee of the present invention, and the complete disclosure of which is hereby incorporated herein by reference.

TECHNICAL FIELD OF THE INVENTION

The present invention relates in general to projection optical systems. The invention relates in particular to large-field catadioptric and catoptric projection optical systems for forming an image of an object at unit magnification.

DISCUSSION OF BACKGROUND ART

Various unit-magnification optical imaging systems are known in the patent literature. Patents related to unit-magnification optical system comprising a concave spherical mirror and a convex spherical mirror include U.S. Pat. No. 3,748,015, U.S. Pat. No. 4,293,186, U.S. Pat. No. 4,711,535, and U.S. Pat. No. 4,796,984.

U.S. Pat. No. 3,748,015 describes a unit-magnification imaging catoptric system comprising a concave spherical mirror and a convex spherical mirror arranged with centers of curvature thereof coincident. There is an aperture stop at the convex mirror. The concentric mirrors are arranged to produce at least three reflections within the system. Two off-axis conjugate areas at unit magnification are coplanar in this system. The axis of this system lies normal to the coplanar object and image planes and through the common centers of curvature of the mirrors. Like most prior-art unit magnification projection systems, embodiments described in '015 patent are symmetric relative to the aperture stop, i.e., are systems consisting of two identical subsystems disposed symmetrically about the (central) aperture stop. Such a symmetric, imaging, catoptric system is intrinsically free of coma and distortion. Since the mirrors disclosed in the '015 patent are concentric, this imaging system is also free of spherical aberration. This optical system is a narrow ring-field design providing sharp imagery only over a quite narrow annular area in the focal plane. In photolithography, such a system is used with a narrow slit aperture to expose this narrow area, and to copy an object (mask) to an image surface by scanning the object and image across this aperture, in synchronism.

U.S. Pat. No. 4,293,186 describes a unit-magnification catadioptric optical imaging system which is an improvement of the catoptric system described in U.S. Pat. No. 3,748,015. U.S. Pat. No. 4,293,186 discloses a system having refractive elements, in addition to reflective elements. This system has means for obtaining stigmatic imagery, in a restricted off-axis field, over an extended spectral range, by balancing the chromatic variation in focus at the center of the restricted off-axis field, due to variation of field curvature, with color by introducing axial color aberration of the opposite sense.

U.S. Pat. No. 4,711,535, discloses another unit-magnification, restricted off-axis, ring-field, catadioptric optical imaging system having broad spectral range and providing improvements to the catoptric system described in the '015 patent, by having optical elements arranged and constructed such that the sum of the refractive powers is nearly zero, and the sum of the reflective powers is also nearly equal to zero. This system includes convex and concave spherical mirrors, pairs of nearly concentric meniscus lens elements, and a pair of identical thick flat parallel plates located adjacent to the object and image planes. The thick flat parallel plates are used to cancel the chromatic aberrations introduced by the meniscus elements.

U.S. Pat. No. 4,796,984 discloses a substantially unit-magnification catadioptric optical imaging system, comprising at least one convex mirror, and at least one concave mirror. The mirrors are supported with their centers of curvature substantially coincident, and means are provided to define a location for an object, the image of which, after at least three reflections including at least one reflection at each of the mirrors, is a real image at a second location. This system further comprises a monocentric meniscus lens between the concave and convex mirrors, and gives overall correction of the Petzval sum for the system to produce a stigmatic image.

It is well known in the optics literature that meniscus lens elements can be used to reduce or correct spherical aberration of principal rays parallel to the optical axis. The application of meniscus lenses for correcting the spherical aberration of the principal rays was described in a book by A. Bouwer, entitled "*Achievements in Optics*," pages 24, 25, and 39, Elsevier Publishing Company, Inc., 1946. Another publication related to the use of meniscus lens element is a paper by D. D. Maksutov, entitled "*New Catadioptric Meniscus System,*" *J. Opt. Soc. Am.* 34(5), pp. 270-284 (1944). An additional publication describing unit magnification imaging systems with compensation meniscus lenses appears in the *Soviet Journal of Optical Technology,* 50(3), March 1983, p. 153.

The use of concentric optical elements is also well known in the optics literature. Publications related to the use of concentric optical elements include the paper by J. Dyson, entitled "*Unit magnification optical system without Seidel aberrations,*" *J. Opt. Soc. Am.* 49(7), pp. 713-716 (1959) and a paper by C. G. Wynne in the articles "*A unit power telescope for projection copying,*" *Optical Instruments and Techniques*, Oriel Press, Newcastle upon Tyne, England (1969), and "*Monocentric telescope for microlithography,*" *Opt. Eng.* 26(4) 300-303 (1987).

The unit-magnification imaging optical systems described in the above-cited references give sharp imagery only over narrow annular area in the focal plane. While the projection lens designs described in these cited patents are quite suitable for normal photolithography applications at 404 nanometers (nm), 365 nm and 248 nm wavelengths, such lens designs have not provided adequate capabilities when the object and image surfaces are separated to more convenient accessible locations by the insertion of plane fold-mirrors, as is required for other applications such as exposure equipment using an illumination source at a laser diode wavelength, for example, 808 nm, 980 nm, or 1024 nm, and requiring large rectangular field sizes, large working distances, and compact packaging volume. The design embodiments described in these above-referenced patents are not suitable to be packaged in a compact volume enclosure for exposure systems requiring large rectangular exposure fields with lengths ranging from one-hundred to a few hundred millimeters (mm) and working distances of at least 100 mm from the system package envelope enclosure. Such distances and dimensions are required for masked laser-patterning apparatus in the manufacture of liquid crystal, LED, and OLED display panels or screens. Due to these shortcomings of the prior art, it is desirable to develop optical designs of large-field unit-magnification projection optical systems capable of imaging, in one exposure, large rectangular object fields with lengths greater than 100 mm, and having working distances greater than 100 mm to significantly increase system throughput in masked laser-patterning apparatus.

SUMMARY OF THE INVENTION

The subject invention relates to a large field, unit-magnification optical system. One preferred embodiment includes a concave and a convex mirror located on the optical axis of the system. A positive lens is spaced from the convex mirror on the opposite side of the concave mirror. The image and object planes lie on opposite sides of the system axis and preferably are equally spaced from the lens.

In one embodiment, a second positive lens and two plane mirrors are used in order to separate the image and object planes of the optical system.

In an alternate embodiment, the system includes a concave and a convex mirror. Instead of a lens, a second concave mirror is provided located between the convex mirror and the first concave mirror.

In a preferred embodiment, an aperture stop is associated with the convex mirror.

Further objects and advantages of the subject invention will become apparent from a review of the detailed description taken in conjunction with the drawings in which:

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

FIG. 1A presents, in table form, an exemplary optical prescription for the system of FIG. 1.

FIG. 3A presents, in table form, an exemplary optical prescription for the system of FIG. 3.

FIG. 5A presents, in table form, an exemplary optical prescription for the system of FIG. 5.

FIG. 6A presents, in table form, an exemplary optical prescription for the system of FIG. 6.

FIG. 7A presents, in table form, an exemplary optical prescription for the system of FIG. 7.

FIG. 9A presents, in table form, an exemplary optical prescription for the system of FIG. 9.

DETAILED DESCRIPTION OF THE INVENTION

Figure 1:
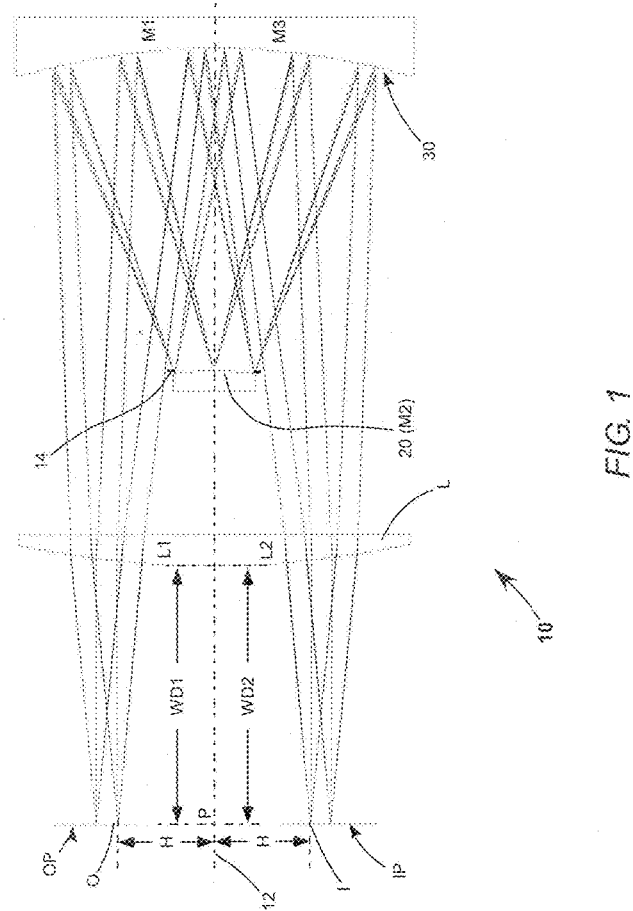
FIG. 1 is an unshaded cross-sectional view schematically illustrating a first preferred embodiment of an imaging projection optical system in accordance with the present invention, including coplanar object and image planes on opposite sides of a system axis and perpendicular thereto, a (singlet) plano-convex lens, a convex mirror and a concave mirror.

Referring now to the drawings, wherein like components are designated by like reference numerals, FIG. 1 is an unshaded cross-sectional view schematically illustrating a first preferred embodiment 10 of an imaging projection optical system in accordance with the present invention. System 10 has a longitudinal system axis 12. Arranged along axis 12 are coplanar object and image planes, OP and IP respectively, on opposite sides of the axis and perpendicular thereto, a plano-convex lens L, a convex mirror 20 (M2) and a concave mirror 30, with the components listed in sequential order. The object and image planes are at working distances WD1 and WD2 respectively from the vertex of lens L. The working distances are equal when the object and image planes are coplanar.

The mirrors of system 10 are arranged to produce at least three reflections within the system, with at least one reflection from each mirror. A system aperture stop 14 is located at mirror 20. In this embodiment, the lens, the convex mirror, and the concave mirror are air-spaced apart from each other. Object plane OP and image plane IP are in the same plane, i.e., are coplanar, and lie normal to axis 12, intersecting the axis at a common point P. The convex surface of lens L and the concave mirror surface are preferably aspheric.

The mirrors and lens element are arranged to have centers of curvature thereof lie along axis 12, and to have off-axis conjugate areas at points O and I. The off-axis conjugate object point O and image point I are located at opposite sides of axis 12, each at a distance H from the axis. The object and image planes are spaced apart from lens L by working distances WD1 and WD2, respectively.

Projection optical system 10 is symmetric relative to the aperture stop 14 located at mirror 20. The system, accordingly, consists of two equal subsystems disposed symmetrically about the aperture stop, making the system initially or intrinsically corrected for coma, distortion, and lateral color aberrations. Because of this, lens L can be considered as two identical lenses L1 and L2 (for first and second transmissions through lens L), and mirror 30 can be considered as two identical mirrors M1 and M3 (for first and second reflections from mirror 30), with "lenses" L1 and L2 on opposite sides of axis 12, and "mirrors" M1 and M3 on opposite sides of axis 12. These designations are used in exemplary optical prescriptions present herein.

Remaining optical aberrations in the system, i.e., aberrations not intrinsically corrected by the symmetry, include astigmatism, Petzval curvature, spherical aberration, and axial color. These aberrations are reduced by adjusting the radii of curvature and aspheric coefficients or geometrical shapes of the lens and mirror elements and axial separations to produce well corrected aberrations, and, accordingly, a diffraction-limited system.

Figure 1A:
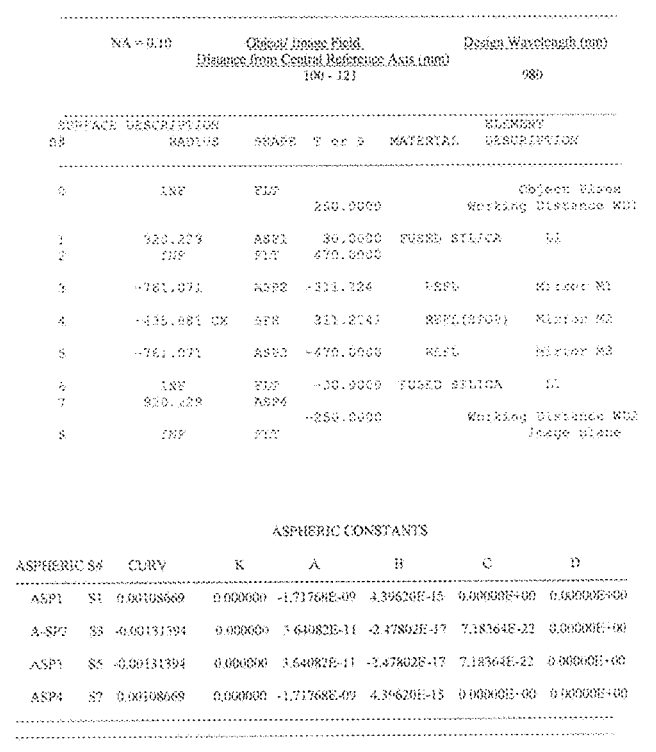

FIG. 1A is a table presenting an exemplary optical prescription for the optical system of FIG. 1. Those skilled in the optical design art will be familiar with such prescription tables and will be able to match the listed surfaces with those depicted in FIG. 1. For completeness of description, however, a brief description of how to read such tables is set forth below, and is applicable to the table of FIG. 1A and similar tables presented herein.

In the prescription tables, a positive radius indicates the center of curvature to the right of the surface, and a negative radius indicates the center of curvature to the left of the surface (referred to the drawings). The thickness is the axial distance to the next surface and all dimensions are in millimeters (mm). Further, "S#" stands for surface number, "T or S" stands for "thickness or separation," and "STOP" stands for aperture stop 14. Also, "CC" stands for "concave" and "CX" stands for "convex." Further, under the heading "surface shape," an aspheric surface is denoted by "ASP", a flat surface by "FLT", and a spherical surface by "SPH." Additionally, under the heading of "material", the glass name and optical material designation are listed. The index of refraction for fused silica material at 980 nm is 1.450671 in the optical prescription tables. In the optical prescription tables at 308 nm, fused silica has a refractive index of 1.485637 and 1.452534 for the calcium fluoride material.

An aspheric equation describing an aspherical surface is given by:

$$Z = \frac{(CURV)Y^2}{1 + (1 - (1 - (1+K)(CURV)^2 Y^2)^{1/2}} + (A)Y^4 + (B)Y^6 + (C)Y^8 + (D)Y^{10} + (E)Y^{12}$$

wherein "CURV" is the spherical curvature of the surface (the reciprocal of the radius of curvature of the surface); K is the conic constant; and A, B, C, D, and E are the aspheric coefficients. In the table, "e" denotes the exponential notation (powers of 10). The design wavelengths (in nanometers) represent wavelengths in the spectral band of the projection optical system, i.e., the wavelengths for which a particular system is corrected.

The optical prescription of FIG. 1A provides diffraction-limited image quality performance at numerical aperture of 0.1, over the spectrum of between 975 nm and 985 nm (980±5 nm), for object/image radial distance from axis 12 ranging from 100 mm to 121 mm, providing an annular (ring) field area with a slit width of 21 mm. This design example gives sharp imagery over this annular area in the focal plane of the system. For practical application, system 10 is normally used to expose only this annular area, as a ring-field system, and to copy an object with a field-size area that can be inscribed within this annular area to an image surface. In masked laser-patterning applications, the object field geometry (mask array geometry) to be copied is normally a narrow, rectangular, line-field, for example, 100 mm long, by 1 mm, or less, wide. The example of FIG. 1A enables a narrow rectangular exposure field-size of at least 100 mm×1 mm, for an NA≤0.10 configuration, with a large working distance of at least 200 mm.

Figure 2:
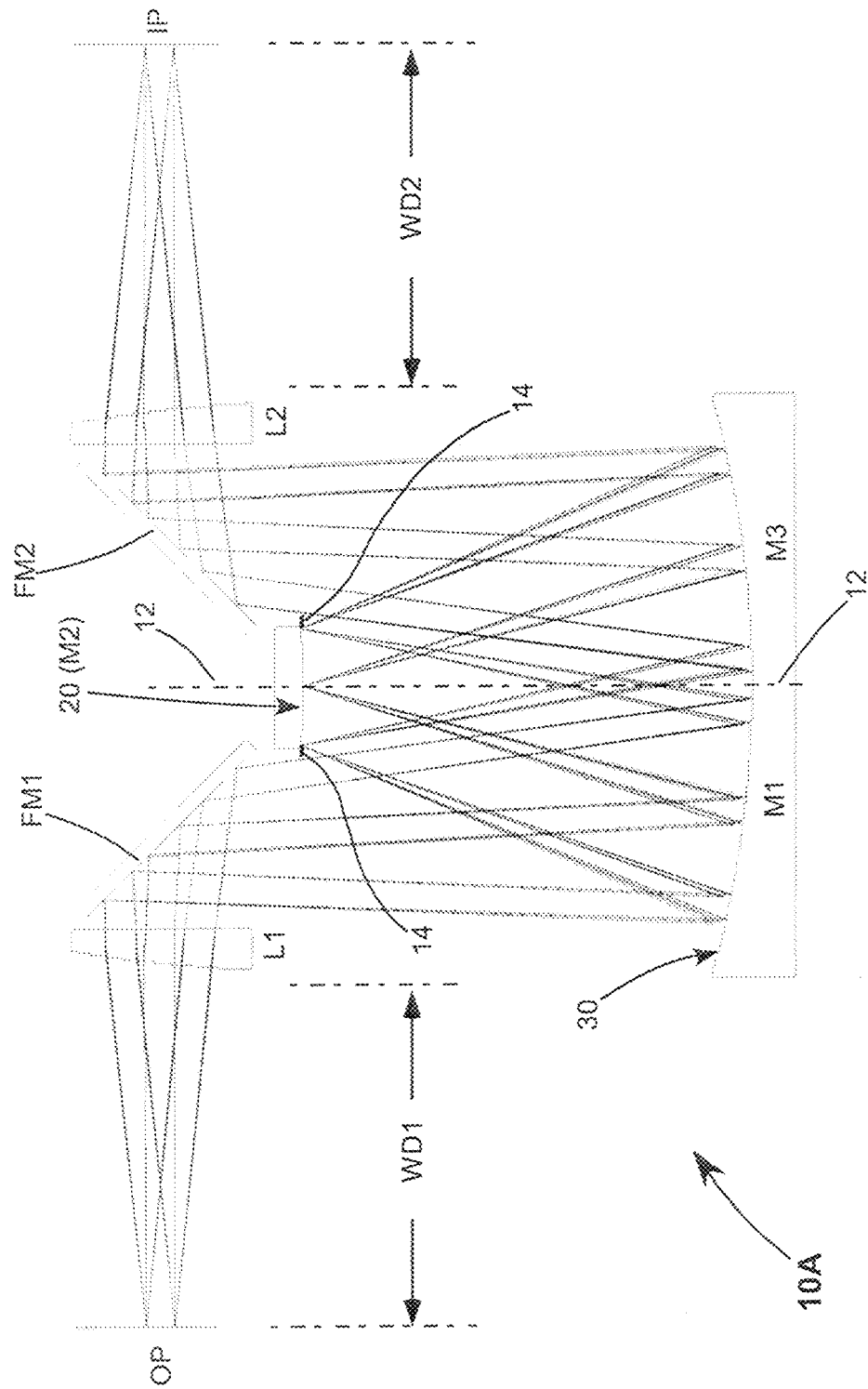
FIG. 2 is an unshaded cross-sectional view schematically illustrating a second preferred embodiment of an imaging projection optical system in accordance with the present invention similar to the embodiment of FIG. 1 but including first and second fold-mirrors and two plano-convex lenses arranged such that object and image planes are separated.

FIG. 2 is an unshaded cross-sectional view schematically illustrating a second preferred embodiment 10A of an imaging projection optical system in accordance with the present invention. System 10A is essentially system 10 of FIG. 1 reconfigured by the addition of fold-mirrors FM1 and FM2 to provide complete separation of object plane OP and image plane IP. Here, the fold mirrors are inclined at 45° to axis 12 such the image and object planes are parallel to the axis on opposite sides thereof.

Lens L of system 10 is now actually divided into two identical, separate lenses L1 and L2, which can be considered to be off-axis sections of lens L of system 10. These lenses can be manufactured by cutting the lenses from a single complete lens corresponding to lens L. The prescription tabulated in FIG. 1A is applicable.

Figure 2A:
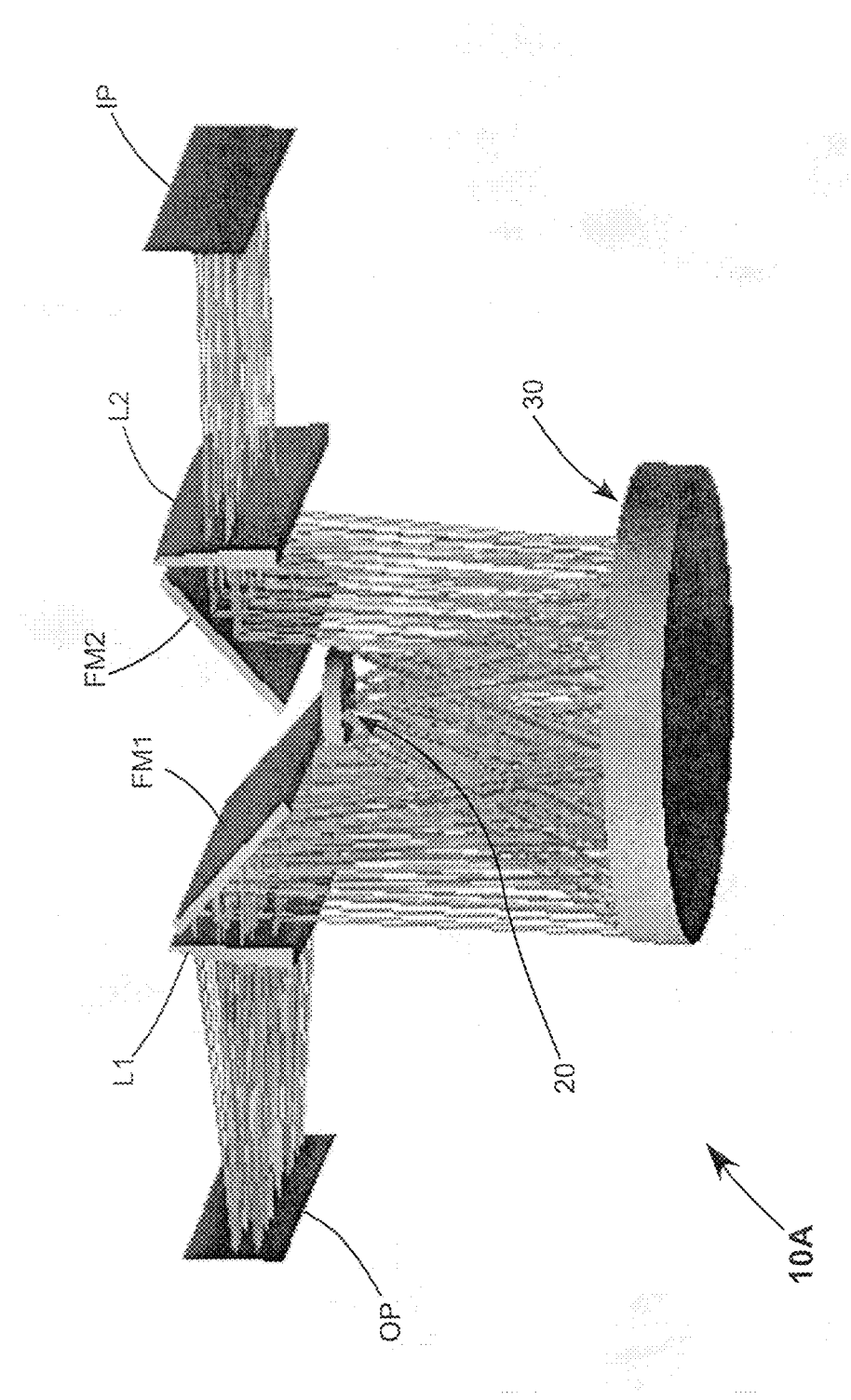
FIG. 2A is a three-dimensional view schematically illustrating further detail of the system of FIG. 2.

FIG. 2A is a three-dimensional view schematically illustrating the arrangement of system 10A of FIG. 2. This illustrates the compact arrangement of the system that is possible. FIG. 2A also illustrates the rectangular form of image and object fields in the image and object planes. Only major components are designated by reference numerals.

Figure 3:
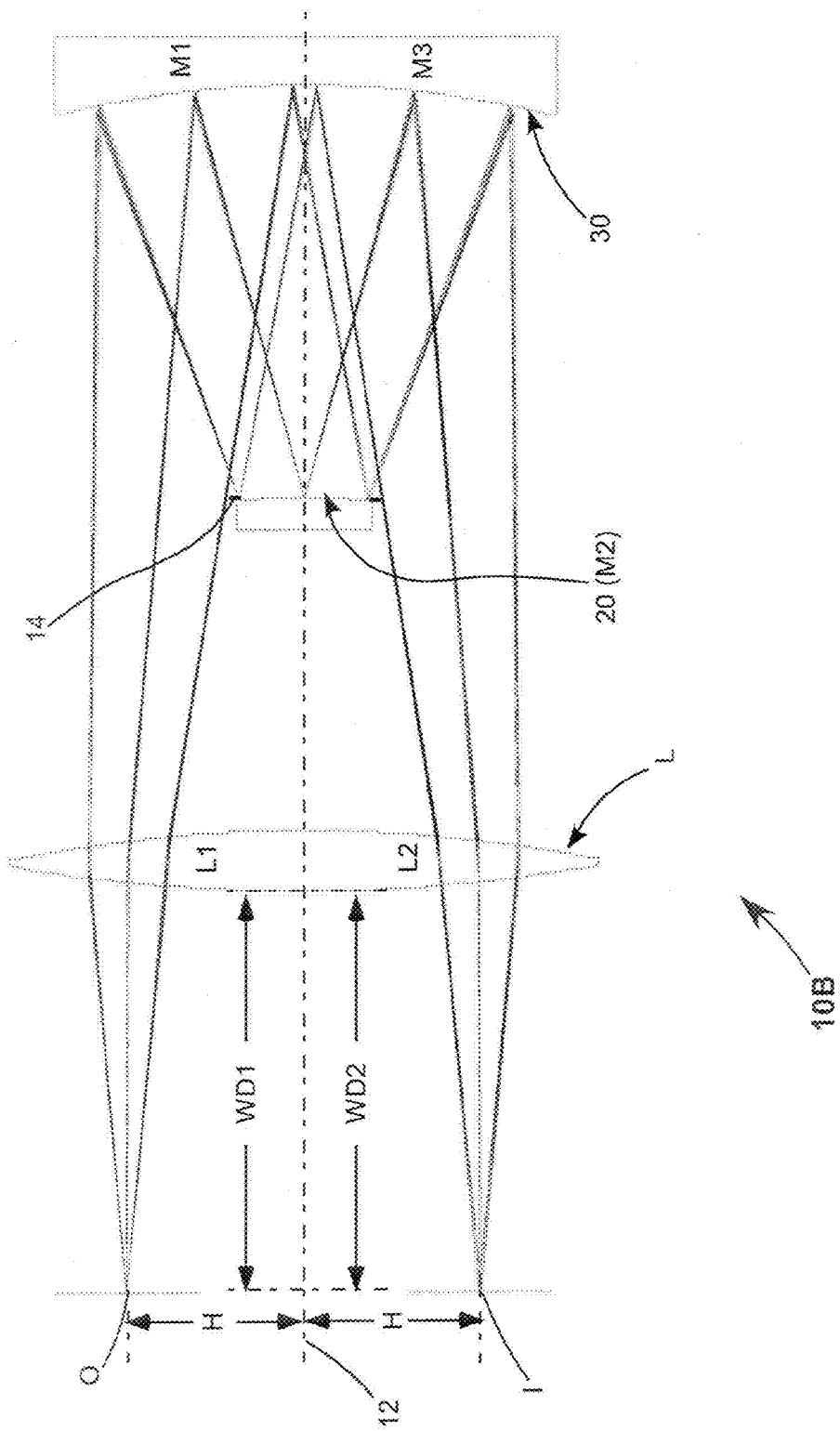
FIG. 3 is an unshaded cross-sectional view schematically illustrating a third preferred embodiment of an imaging projection optical system in accordance with the present invention, similar to the embodiment of FIG. 1 but wherein the singlet plano convex lens of the first embodiment is replaced by a singlet bi-convex lens.

FIG. 3 is an unshaded cross-sectional view schematically illustrating a third preferred embodiment 10B of an imaging projection optical system in accordance with the present invention. System 10B is similar system 10 of FIG. 1 with an exception that plano-convex lens L of the first embodiment is replaced by a bi-convex lens. Here, and in other drawings referenced below, functionally similar components are designated by like reference numerals to facilitate comparison. This example covers applications in masked laser-patterning apparatus utilizing diode-laser illuminated object fields for exposure at 980 nm wavelength.

An exemplary optical prescription for system 10B is presented in table form in FIG. 3A. This provides diffraction-limited image quality performance at a numerical aperture of 0.1 over the spectrum of 980±5 nm for object/image radial distance from axis 12 of 120 mm to 140 mm. This enables an annular area with slit-width size of 20 mm. This system can be used for imaging applications with the same diffraction-limited image quality performance for exposing a rectangular field-size area that can be inscribed in an annular area with a slit-width size of 20 mm.

Figure 4:
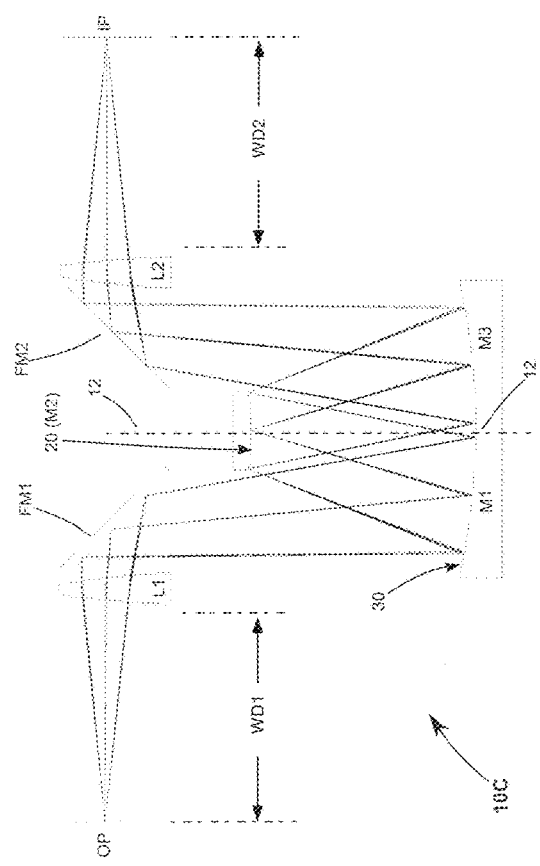
FIG. 4 is an unshaded cross-sectional view schematically illustrating a fourth preferred embodiment of an imaging projection optical system in accordance with the present invention similar to the embodiment of FIG. 3 but including first and second fold-mirrors and two bi-convex lenses arranged such that object and image planes are separated.

FIG. 4 is an unshaded cross-sectional view schematically illustrating a fourth preferred embodiment 10C of an imaging projection optical system in accordance with the present invention. System 10C is essentially system 10B of FIG. 3 reconfigured, in a manner similar to that described above for system 10A of FIG. 2, by the addition of fold-mirrors FM1 and FM2. As in system 10A, lens L of system 10 is here actually divided into two separate lenses L1 and L2, which can be considered to be off-axis sections of lens L of system 10B. The prescription tabulated in FIG. 3A is applicable. Aperture stop 14 at mirror 20 is not shown in FIG. 4 for convenience of illustration.

Figure 4A:
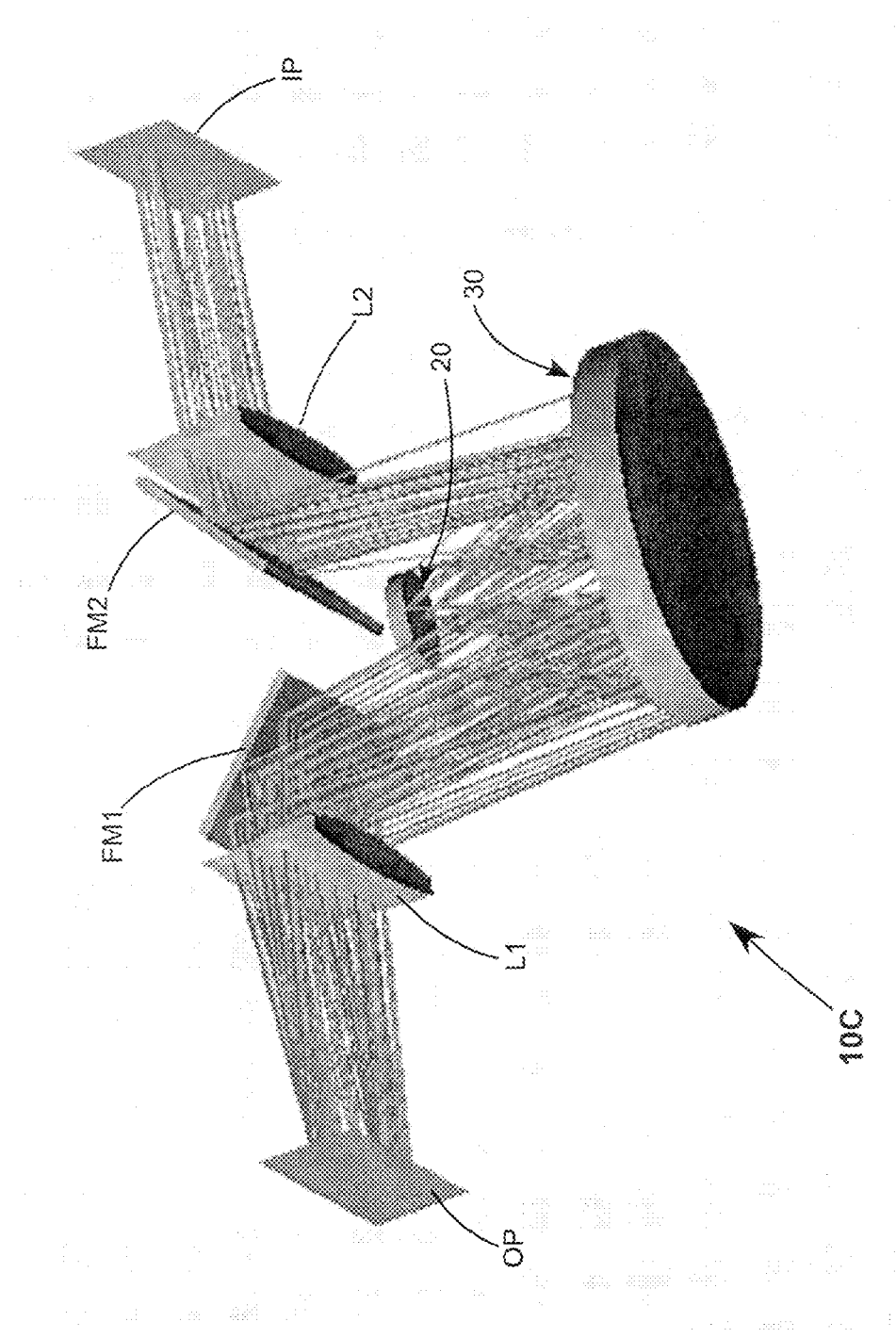
FIG. 4A is a three-dimensional view schematically illustrating further detail of the system of FIG. 4.

FIG. 4A is a three-dimensional view schematically illustrating the arrangement of system 10C of FIG. 4. This illustrates the compact arrangement of the system that is possible. Here again, only major components are designated by reference numeral.

Figure 5:
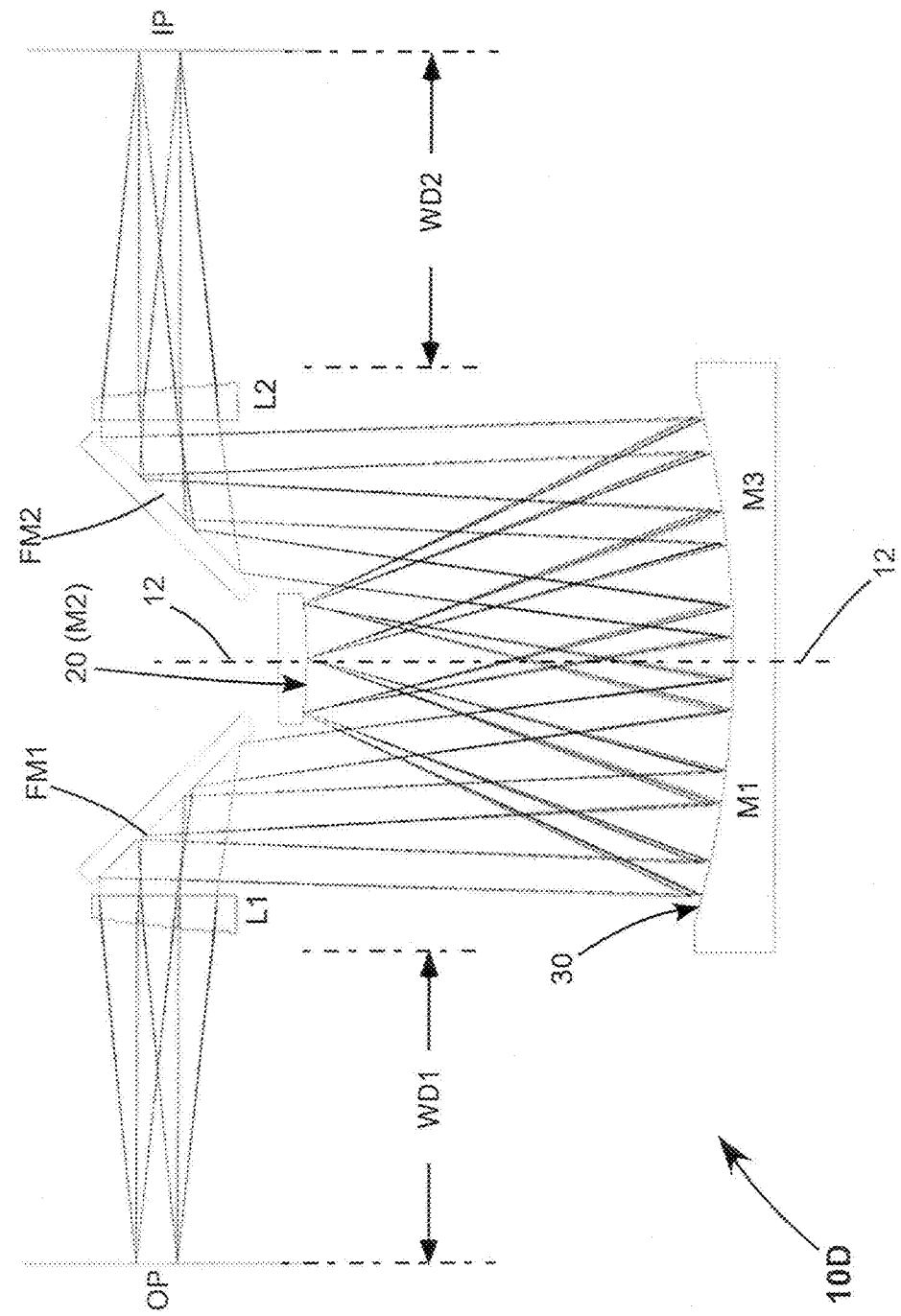
FIG. 5 is an unshaded cross-sectional view schematically illustrating a fifth preferred embodiment of an imaging projection optical system in accordance with the present invention similar to the embodiment of FIG. 2 but with components having different optical prescriptions.

FIG. 5 is an unshaded cross-sectional view schematically illustrating a fifth preferred embodiment 10D of an imaging projection optical system in accordance with the present invention. System 10D is similar to system 10A of FIG. 2 but with components and spacings having a somewhat different specification. Aperture stop 14 at mirror 20 is not shown in FIG. 5 for convenience of illustration.

An exemplary prescription is presented in table form in FIG. 5A. This prescription provides a system with diffraction-limited image quality performance at a numerical aperture of 0.1 over the spectrum of 980 nm for object/image radial distance from axis 12 from 110 mm to 140 mm. This provides an annular field area with slit-width of 30 mm. Within this object/image field, radial distance range, a narrow rectangular line-field of at least 260 mm×1 mm can be inscribed within the annular area of the 30 mm slit-width field. This example can be used as a unit magnification imaging projection optical system in masked laser-patterning apparatus enabling a narrow rectangular exposure line-field size of at least 260 mm×1 mm, for the NA≤0.10 configuration, with a large working distance of at least 200 mm.

Figure 5B:
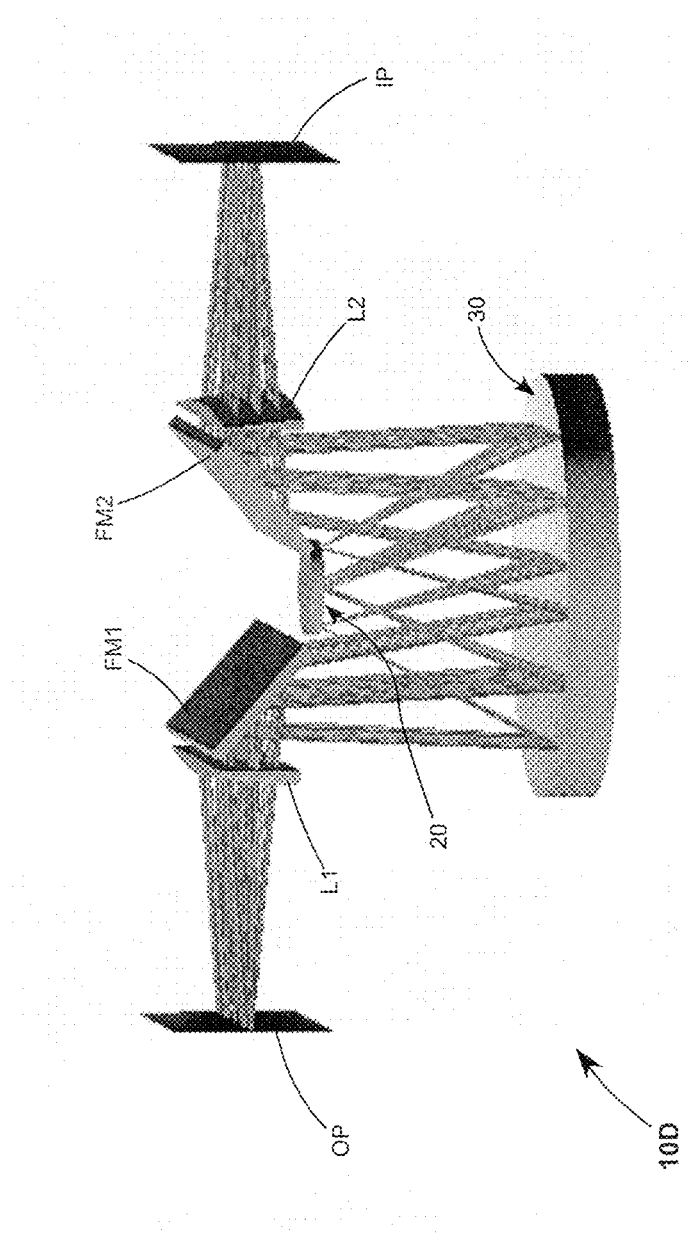
FIG. 5B is a three-dimensional view schematically illustrating further detail of the system of FIG. 5.

FIG. 5B is a three-dimensional view schematically illustrating the arrangement of system 10D of FIG. 5. This illustrates the compact arrangement of the system that is possible. As in other above-referenced three-dimensional drawings, only major components are designated by reference numerals.

Figure 6:
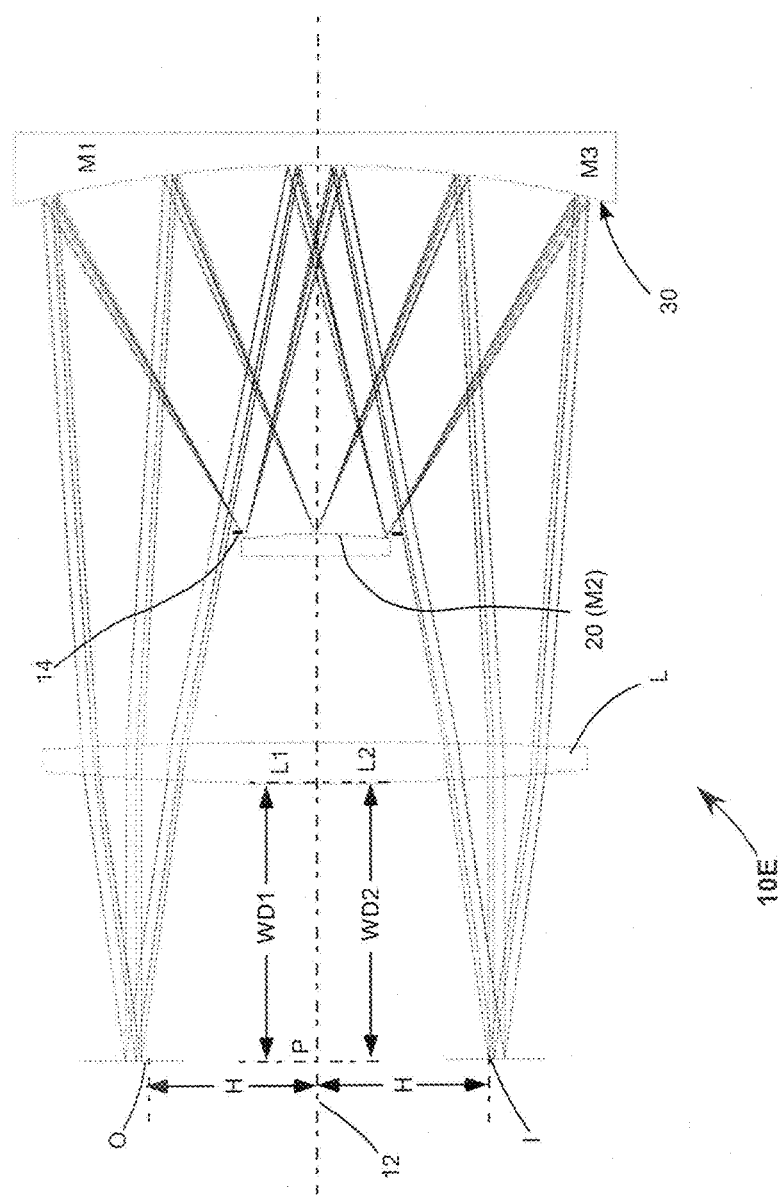
FIG. 6 is an unshaded cross-sectional view schematically illustrating a sixth preferred embodiment of an imaging projection optical system in accordance with the present invention, similar to the embodiment of FIG. 3 but with components, exposure wavelengths, and spacings having a somewhat different specification.

FIG. 6 is an unshaded cross-sectional view schematically illustrating a sixth preferred embodiment 10E of an imaging projection optical system in accordance with the present invention. System 10E is similar to system 10B of FIG. 3 but with components, exposure wavelengths, and spacings having a somewhat different specification. An exemplary prescription for system 10E is presented in table form in FIG. 6A. This example covers applications for exposure system for material annealing using light illumination from a xenon chloride ($XeCl_2$) laser source at wavelength of 308 nm. The prescription provides for diffraction-limited image quality performance at numerical aperture of 0.13, over a narrow spectrum centered at 308 nm, for object/image radial distance from axis 12 of 69 mm to 75 mm. This provides an annular field area with slit width of 6 mm, enabling a narrow, rectangular, exposure field of at least 100 mm×2 mm, with a working distance of at least 100 mm.

Figure 7:
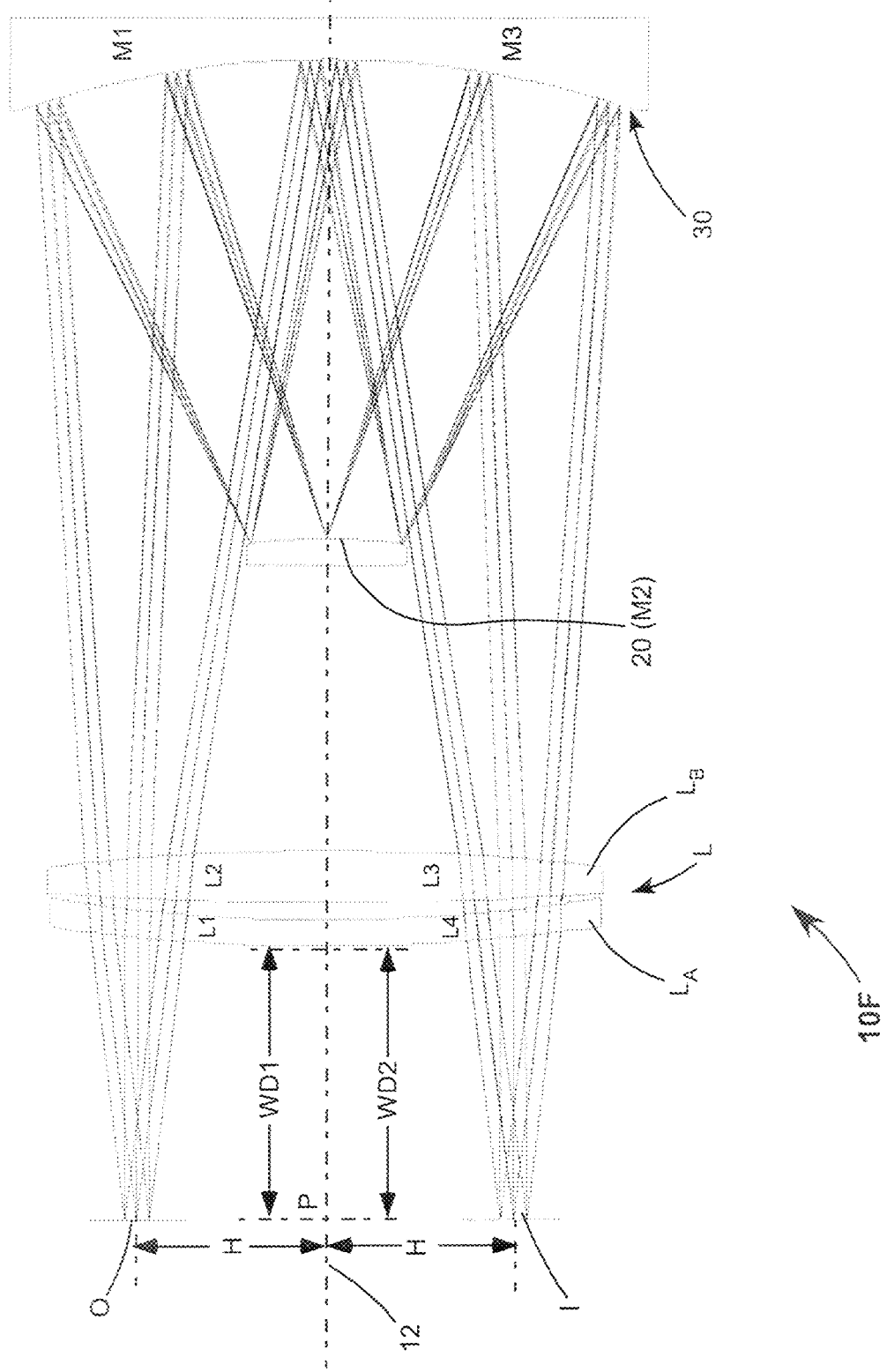
FIG. 7 is an unshaded cross-sectional view schematically illustrating a seventh preferred embodiment of an imaging projection optical system in accordance with the present invention, similar to the embodiment of FIG. 6 wherein the singlet lens is replaced by an air-spaced doublet lens.

FIG. 7 is an unshaded cross-sectional view schematically illustrating a seventh preferred embodiment 10F of an imaging projection optical system in accordance with the present invention. System 10F is similar to system 10B of FIG. 6 with an exception that lens L is now an air-spaced doublet lens consisting of a negative meniscus element $L_A$, and a bi-convex element $L_B$. Element $L_A$ can be represented, for calculation purposes, by two parts L1 and L4, and element $L_B$ can be represented by two parts L2 and L3. The parts, here, are sequentially numbered in order of transmission therethrough from object to image. Aperture stop 14 at mirror 20 is not shown in FIG. 6 for convenience of illustration.

An exemplary prescription for system 10F is presented in table form in FIG. 7A. This prescription provides for diffraction-limited imagery at NA=0.13, over a 307-309 nm spectrum, for object/image radial distance from axis 12 of 69 mm to 75 mm. This provides an annular field area with slit-width of 6 mm, and enables a rectangular exposure field of at least 100 mm×2 mm, with a working distance of at least 100 mm.

Figure 8:
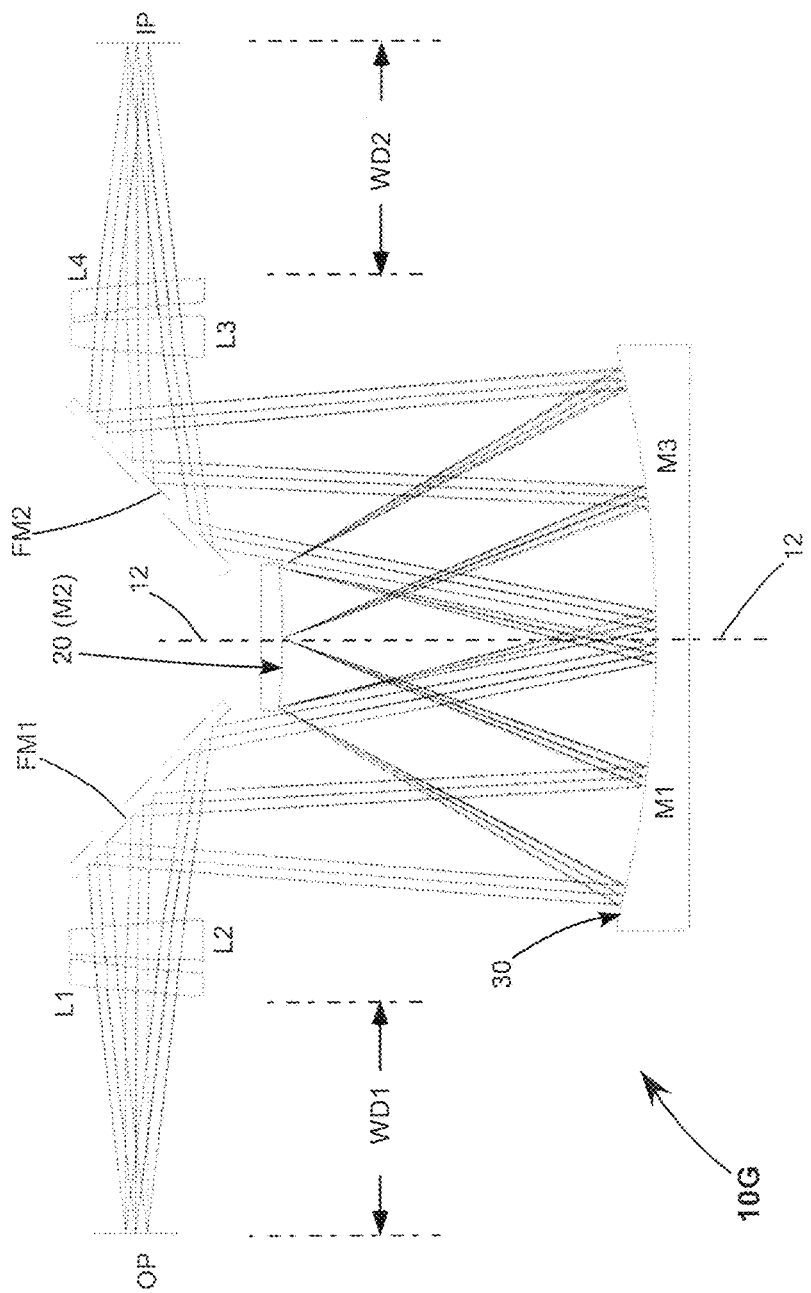
FIG. 8 is an unshaded cross-sectional view schematically illustrating an eighth preferred embodiment of an imaging projection optical system in accordance with the present invention similar to the embodiment of FIG. 7 but including two fold-mirrors arranged to separate image and object planes.

FIG. 8 is an unshaded cross-sectional view schematically illustrating an eighth preferred embodiment 10G of an imaging projection optical system in accordance with the present invention. System 10G is essentially system 10F folded by fold-mirrors FM1 and FM2, as in other embodiments described above, with lens-portions L1, L2, L3 and L4 now separate, and forming two identical air-spaced doublet lenses. The prescription of FIG. 7A is applicable in this embodiment. Aperture stop 14 at mirror 20 is not shown in FIG. 8 for convenience of illustration.

Figure 9:
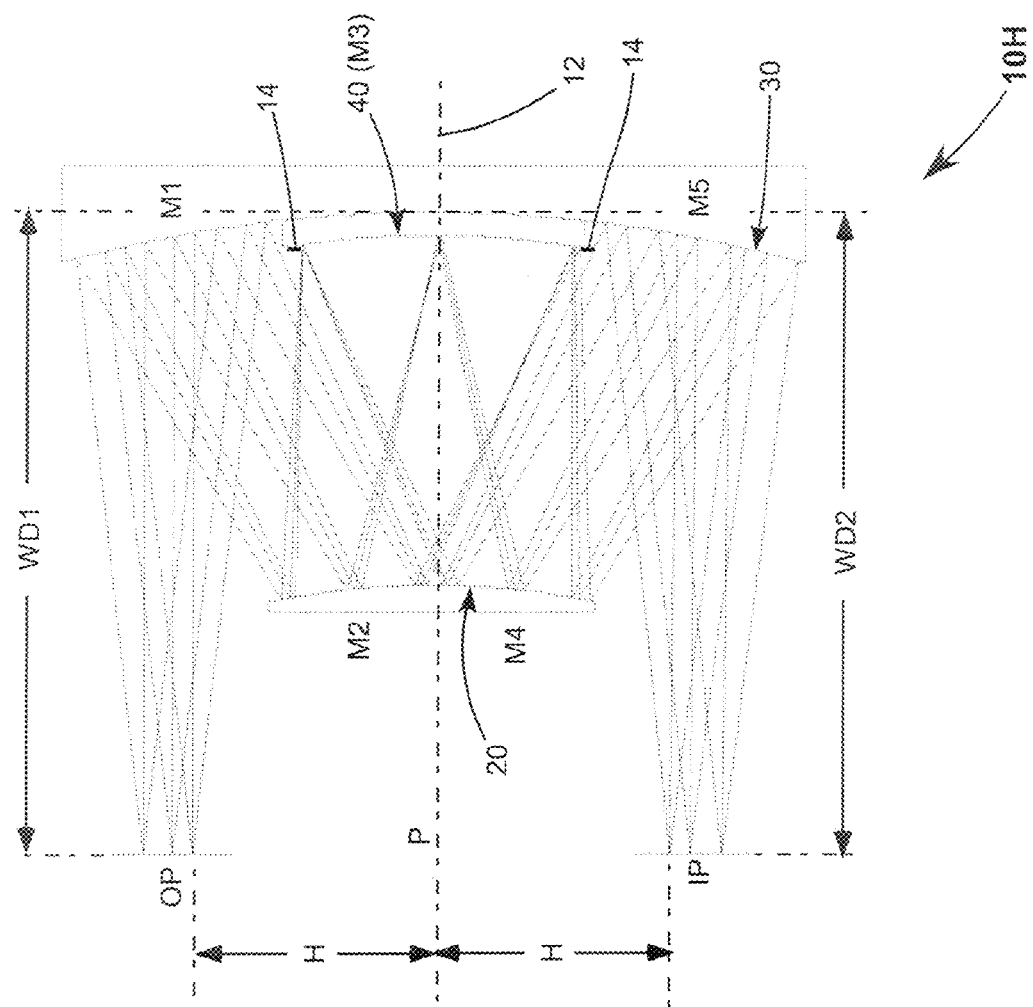
FIG. 9 is an unshaded cross-section view schematically illustrating a ninth preferred embodiment of an imaging projection optical system in accordance with the present invention including a convex mirror, a first concave mirror spaced apart from the convex mirror, and a second concave mirror adjacent the first concave mirror, the system configured such that a light ray propagating from an object plane to a coplanar image plane is reflected twice from the first concave mirror, twice from the convex mirror and once from the second concave mirror.

FIG. 9 is an unshaded cross-section view schematically illustrating a ninth preferred embodiment 10H of an imaging projection optical system in accordance with the present invention. System 10H is a catoptric system, The system includes, arranged along longitudinal axis 12 thereof, coplanar object and image planes OP and IP respectively, a first concave mirror 30, and a smaller, second concave mirror 40 adjacent the first concave mirror. These mirrors are axially symmetric with axis 12, and the centers of curvature of the mirrors (not shown) lie along the axis. System aperture stop 14 is located at mirror 40. A convex mirror 20 is air-spaced apart from the concave mirrors.

The three mirrors in system 10H are arranged to produce at least five reflections within the system for light propagating from the object plane to the image plane. At least two reflections occur from mirror 30, at least two reflections occur from mirror 20, and at least one reflection occurs from mirror 40. The concave mirrors may be positioned air-spaced apart from each other. Alternatively, mirror 40 may be mounted with the back side thereof supported by the front surface of mirror 30, as depicted in the drawing. Mirror 20 can be considered, for calculation purposes, as having two identical parts M2 and M4 on opposite sides of axis 12. Mirror 30 can be considered as having two identical parts M1 and M5 on opposite sides of axis 12. Mirror 40 can be designated as having only one part M3, centered on axis 12. The mirror parts are numbered in order of reflection of a light ray propagating through the system from the object plane to the image plane.

As noted above, object plane OP and image plane IP are coplanar (in the same plane) and are located at distance H from axis 12 on opposite sides thereof. The object plane is spaced apart from the vertex of mirror 30, parallel to axis 12, by an object distance WD1. The image plane is spaced apart from the vertex of mirror 30, parallel to axis 12, by an object distance WD2. WD1 and WD2 are equal in this coplanar arrangement.

System 10H is symmetric relative to aperture stop 14 on mirror 40. Because of this symmetry relative to the aperture stop, the catoptric system is initially corrected for coma, and distortion aberrations. In a preferred example of system 10H, the radii of curvature and aspheric coefficients of the mirror elements, and the separations thereof, are chosen to produce a diffraction-limited image quality at the focal plane (image/object plane), for an annular field area, with slit-width of 15 mm for object/image radial distance from the reference central axis of 230 mm to 245 mm. This example can be used as a unit-magnification imaging projection optical system in masked laser-patterning apparatus enabling a narrow rectangular exposure line-field size of at least 260 mm×1 mm, for the NA=0.10 configuration, with a large working distance. An exemplary prescription for providing this result is presented in table form in FIG. 9A.

Figure 10:
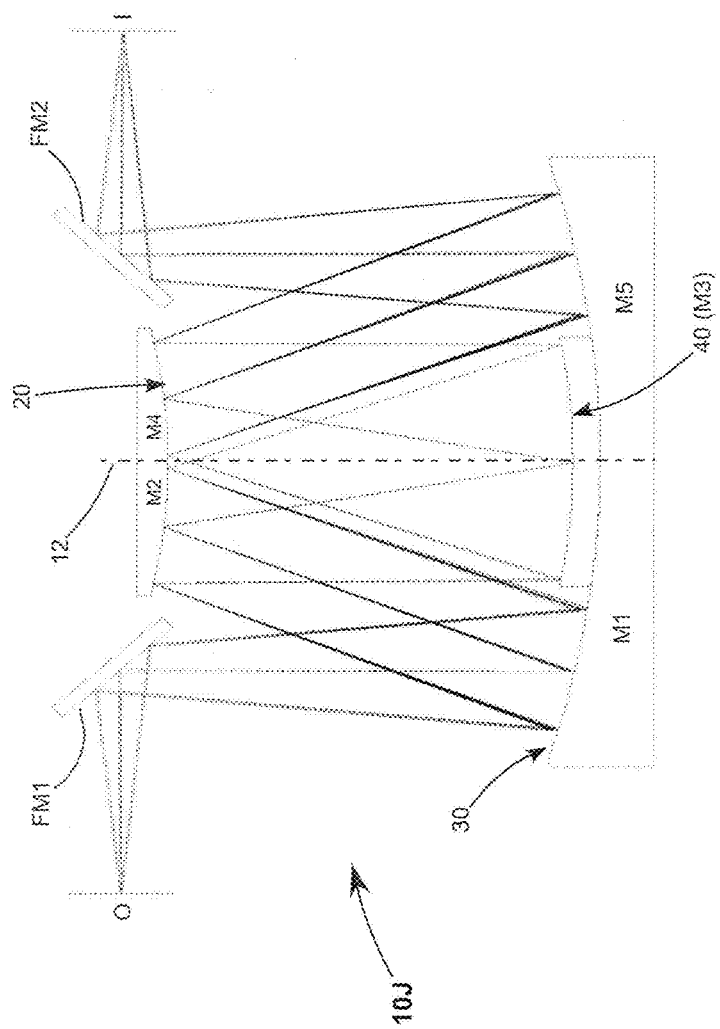
FIG. 10 is an unshaded cross-section view schematically illustrating a tenth preferred embodiment of an imaging projection optical system in accordance with the present invention similar to the embodiment of FIG. 9 but further including two fold-mirrors arranged to separate the image and object planes.

FIG. 10 is an unshaded cross-section view schematically illustrating a tenth preferred embodiment of an imaging projection optical system in accordance with the present invention similar to the embodiment of FIG. 9 but further including two fold-mirrors arranged to separate the image and object planes. The prescription of FIG. 9A is applicable here. Aperture stop 14 at mirror 40 is not shown in FIG. 4 for convenience of illustration.

Figure 11:
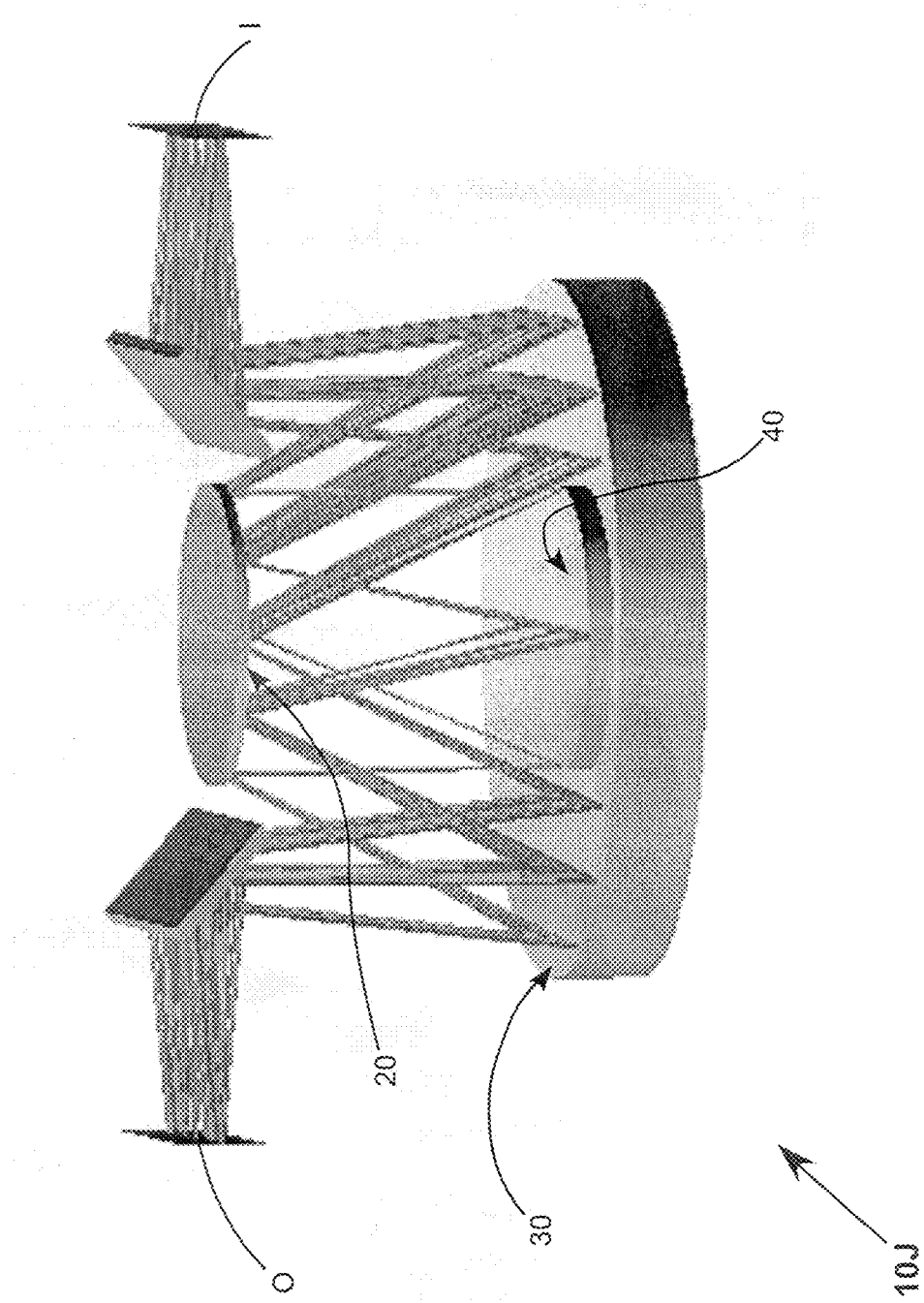
FIG. 11 is a three-dimensional view schematically illustrating further detail of the embodiment of FIG. 10.

FIG. 11 is a three-dimensional view schematically illustrating further detail of the embodiment of FIG. 10.

The present invention provides a variety of improvements on the prior-art optical systems described in the above-mentioned patents and papers. The present invention enhances the utility of these well-known systems providing design embodiments applicable not only for exposure systems for photolithography and material annealing, but also for masked laser-patterning, high-throughput systems.

Unlike the prior art, the mirror and lens surfaces of the optical elements in these design embodiments need not be concentric in order to provide an overall high level of aberration correction for the unit magnification imaging system. The centers of curvature of mirrors and lenses can readily be determined from one familiar with the optical design art from the prescription tables presented herein.

Refractive elements do not need to all be meniscus elements. Without a restriction on concentricity of optical surfaces of the mirrors and lenses, the unit-magnification projection optical system of the present invention extends its utility not only for NA≥0.1 systems, but also for large rectangular line-field and large-working-distance imaging applications.

Above-described embodiments of the present invention provide designs of unit magnification imaging optical systems for masked laser patterning with rectangular exposure fields with lengths greater that 100 mm and working distances greater than 100 mm. This provides for a system with essentially diffraction-limited imagery applicable not only to exposure equipment using light illumination at diode-laser wavelengths, for example, 808 nm, 980 nm, and 1024 nm, but also to exposure equipment using light illumination at other wavelengths, such as excimer laser wavelengths.

The present invention also provides design embodiments of large rectangular-field, unit-magnification, projection optical systems with NA≥0.1, applicable for the scanning, step-and-repeat, or step-and-scan exposure system applications. A basic optical design concept of the projection optical system of the present invention utilizes the symmetry properties of optical elements relative to the aperture stop. In an axially symmetric lens system, this consists in placing lens combinations symmetrically with reference to the center of the limiting aperture stop such that the lens elements on each side of the aperture stop are exactly similar, made to the same scale with the same material. The object and image are also of equal size, and the lenses are positioned at equal distances from the aperture stop plane. Such a symmetrical imaging system operates at unit magnification and is initially corrected for monochromatic third-order coma, distortion, and lateral color aberrations.

The compact large-field unit-magnification imaging catadioptric and catoptric projection optical system of the present invention evolved as a result of applying not only the symmetrical principle but also by the using a reflective aperture stop or an aperture stop located at or nearly at the mirror element. In the preferred embodiments the aperture stop of the system is located at a mirror element and this mirror in conjunction with other mirror elements and lens elements in the system helps to correct the remaining optical aberrations, not corrected by the symmetry. These aberrations include astigmatism, Petzval curvature, spherical aberration, and axial color. This provides for well corrected aberrations and a diffraction-limited system. For broad-spectral-band, catadioptric system applications, the chromatic aberrations and chromatic variations of the monochromatic aberrations are reduced also by choosing the dioptric power distributions of the lens elements, the lens element shape-factors or geometrical shapes, and the proper glass materials for system achromatization.

The present invention is described above with reference to preferred embodiments. The invention, however, is not restricted to the embodiments depicted herein. Rather the invention is defined by the claims appended hereto.

What is claimed is:

1. A unit-magnification optical system having a longitudinal system axis, comprising:
   a concave mirror located on the system axis;
   a convex mirror located on the system axis and spaced apart from the concave mirror;
   a lens including at least one optical element and having positive optical power located on the system axis and spaced apart from the convex mirror on the opposite side thereof from the concave mirror;
   an object plane located spaced apart by a first working distance from the lens;
   an image plane located spaced apart by a second working distance from the lens; and
   wherein the object plane and image plane lie on opposite sides of the system axis; and
   wherein the lens consists of first and second air-spaced elements and wherein the first element is a negative meniscus element and the second element is a bi-convex element.

2. The optical system of claim 1, wherein the mirrors and lens are arranged such that a light ray propagating from the object plane to the image plane is transmitted twice through the lens, reflected twice from the concave mirror, and reflected once from the convex mirror.

3. The optical system of claim 1, wherein the first and second working distances are the same.

4. The optical system of claim 3 wherein object and image planes are coplanar in a plane perpendicular to the system axis.

5. The optical system of claim 1 wherein the centers of curvature of the convex surface of the bi-convex element, the convex mirror, and the concave mirror are not concentric.

6. A unit-magnification optical system having a longitudinal system axis, comprising:
   a concave mirror located on the system axis;
   a convex mirror located on the system axis and spaced apart from the concave mirror;
   a lens including at least one optical element and having positive optical power located on the system axis and spaced apart from the convex mirror on the opposite side thereof from the concave mirror;
   an object plane located spaced apart by a first working distance from the lens;

an image plane located spaced apart by a second working distance from the lens, wherein the object plane and image plane lie on opposite sides of the system axis; and an aperture stop located at the convex mirror and defining a numerical aperture (NA) of the optical system.

7. The optical system of claim 6, wherein the lens consists of first and second air-spaced elements.

8. The optical system of claim 7, wherein the first element is a negative meniscus element and the second element is a bi-convex element.

9. The optical system of claim 6, wherein the lens consists of only one element and that one element is selected from the group consisting of a plano-convex element and a bi-convex element.

10. A unit-magnification optical system having a longitudinal system axis, comprising:

a concave mirror located on the system axis;

a convex mirror located on the system axis and spaced apart from the concave mirror;

first and second plane mirrors spaced apart from the convex mirror, located on opposite sides of the system axis, and inclined to the system axis; and first and second positive lenses, each thereof including at least one lens element, the first positive lens being spaced apart from the first plane mirror and defining an object plane spaced apart from the first positive lens, the second positive lens being spaced apart from the second plane mirror and defining an image plane spaced apart from the second positive lens, whereby the object plane and the image plane lie on opposite sides of the system axis and wherein the first and second positive lenses are identical and wherein each of the positive lenses consists of first and second air-spaced elements and wherein the first element is a negative meniscus element and the second element is a bi-convex element.

11. The optical system of claim 10, wherein the mirrors and lenses are arranged such that a light ray propagating from the object plane to the image plane is transmitted once through the first positive lens, reflected twice from the concave mirror, reflected once from the convex mirror, then transmitted through the second positive lens.

12. The optical system of claim 10 wherein each of the plane mirrors are inclined at 45 degrees to the system axis such that the object and image planes are parallel to the system axis.

13. A unit-magnification optical system having a longitudinal system axis, comprising:

a concave mirror located on the system axis;

a convex mirror located on the system axis and spaced apart from the concave mirror;

first and second plane mirrors spaced apart from the convex mirror, located on opposite sides of the system axis, and inclined to the system axis;

first and second positive lenses, each thereof including at least one lens element, the first positive lens being spaced apart from the first plane mirror and defining an object plane spaced apart from the first positive lens, the second positive lens being spaced apart from the second plane mirror and defining an image plane spaced apart from the second positive lens, whereby the object plane and the image plane lie on opposite sides of the system axis; and an aperture stop located at the system axis and defining a numerical aperture (NA) of the optical system.

14. The optical system of claim 13, wherein the first and second positive lenses are identical.

15. The optical system of claim 14, wherein the each of the positive lenses consists of only one element and that element is selected from the group consisting of a plano-convex element and a bi-convex element.

16. The optical system of claim 12, wherein each of the positive lenses consists of first and second air-spaced elements.

17. The optical system of claim 16, wherein the first element is a negative meniscus element and the second element is a bi-convex element.

18. A unit-magnification optical system having a longitudinal system axis, comprising:

a first concave mirror located on the system axis;

a convex mirror located on the system axis and spaced apart from the concave mirror;

a second concave mirror smaller than the first concave mirror, located on the system axis between the first concave mirror and the convex mirror an object plane located spaced apart by a first working distance from the first concave mirror;

an image plane located spaced apart by a second working distance from the first concave mirror; and wherein the object plane and image plane lie on opposite sides of the system axis.

19. The optical system of claim 18 wherein the mirrors are arranged such that a light ray propagating from the object plane to the image plane is reflected twice from the first concave mirror, twice from the convex mirror and once from the second concave mirror.

20. The optical system of claim 18, further including at least one plane reflecting surface immediately adjacent the convex mirror, inclined to the optical axis, and arranged to spatially separate the object and image planes.

* * * * *